US009637239B2

(12) United States Patent
Poisson et al.

(10) Patent No.: US 9,637,239 B2
(45) Date of Patent: May 2, 2017

(54) STRUCTURE FOR SUSPENDING A TURBOPROP HAVING TWO UNDUCTED PROPELLERS ON A STRUCTURAL ELEMENT OF AN AIRPLANE

(71) Applicant: SNECMA, Paris (FR)

(72) Inventors: Mathieu Ange Alexis Poisson, Corbeil-Essonnes (FR); Julien Michel Patrick Christian Austruy, Yerres (FR); François Gallet, Paris (FR); Mario Lambey, Paris (FR)

(73) Assignee: SNECMA, Paris (FR)

( * ) Notice: Subject to any disclaimer, the term of this patent is extended or adjusted under 35 U.S.C. 154(b) by 62 days.

(21) Appl. No.: 14/786,500

(22) PCT Filed: Apr. 24, 2014

(86) PCT No.: PCT/FR2014/050999
§ 371 (c)(1),
(2) Date: Oct. 22, 2015

(87) PCT Pub. No.: WO2014/174222
PCT Pub. Date: Oct. 30, 2014

(65) Prior Publication Data
US 2016/0159486 A1     Jun. 9, 2016

(30) Foreign Application Priority Data
Apr. 26, 2013   (FR) ..................................... 13 53872

(51) Int. Cl.
*B64D 27/10*     (2006.01)
*B64D 27/26*     (2006.01)
*F02C 7/20*     (2006.01)

(52) U.S. Cl.
CPC ............. *B64D 27/10* (2013.01); *B64D 27/26* (2013.01); *F02C 7/20* (2013.01); *B64D 2027/264* (2013.01); *B64D 2027/266* (2013.01)

(58) Field of Classification Search
CPC .......... B64C 7/10; B64D 27/10; B64D 27/26; B64D 2027/262; B64D 2027/266; B64D 2027/264; B64D 29/06; F02C 7/20
See application file for complete search history.

(56) References Cited

U.S. PATENT DOCUMENTS 8,939,398 B2 *   1/2015   Letay ..................... B64D 27/26
                                               244/53 B
9,488,106 B2 *   11/2016   Gaillot .................... B64C 7/02
(Continued)

FOREIGN PATENT DOCUMENTS

EP       0 761 945 A1     3/1997
EP       1 053 937 A1     11/2000
(Continued)

OTHER PUBLICATIONS

English Translation of Search Report mailed on Aug. 14, 2014, in corresponding International PCT Application No. PCT/FR2014/050999, filed on Apr. 24, 2014 (3 pages).

*Primary Examiner* — Valentina Xavier
(74) *Attorney, Agent, or Firm* — Bookoff McAndrews, PLLC

(57) ABSTRACT

The invention provides a suspension structure for suspending a turboprop (10) having two unducted propellers on a structural element of an aircraft, the suspension structure comprising a cradle (18) for fastening to a structural element of the aircraft and having two lateral beams (22) connected to a main beam (20) extending parallel to a longitudinal axis (14) of the turboprop so as to form a V-shaped cradle structure, the cradle being fastened to the turboprop via two angle members (24) connecting each free end of the lateral
(Continued)

beams of the cradle to the turboprop, via an axial link (28) connecting one end of the main beam of the cradle of the turboprop, and via at least one transverse link (30) situated in a plane extending transversely relative to the longitudinal axis of the turboprop and connecting the cradle to the turboprop.

10 Claims, 3 Drawing Sheets

(56) References Cited

U.S. PATENT DOCUMENTS

| | | | |
|---|---|---|---|
| 2011/0036942 A1* | 2/2011 | Marche | B64D 27/26 244/54 |
| 2011/0127369 A1* | 6/2011 | Dussol | B64D 27/18 244/54 |
| 2016/0376016 A1* | 12/2016 | Poisson | F02C 6/206 244/54 |

FOREIGN PATENT DOCUMENTS

| | | |
|---|---|---|
| EP | 1 090 838 A1 | 4/2001 |
| EP | 1 538 080 A1 | 6/2005 |
| EP | 1 982 915 A1 | 10/2008 |
| EP | 2 554 478 A1 | 2/2013 |

\* cited by examiner

STRUCTURE FOR SUSPENDING A TURBOPROP HAVING TWO UNDUCTED PROPELLERS ON A STRUCTURAL ELEMENT OF AN AIRPLANE

CROSS-REFERENCE TO RELATED APPLICATIONS

This application is the U.S. national phase entry under 35 U.S.C. §371 of International PCT Application No. PCT/FR2014/050999, filed on Apr. 24, 2014, which claims priority to French Patent Application No. FR 1353872 filed on Apr. 26, 2013, the entireties of each of which are incorporated by reference herein.

BACKGROUND OF THE INVENTION

The present invention relates to the general field of aircraft turboprops having two unducted propellers. The invention relates more precisely to attaching such a turboprop to a structural element of the aircraft, such as the fuselage or a wing or an airplane.

In known manner, an aircraft turboprop having two propellers is an aeroengine in which the main thrust is generated by two contrarotating propellers that are not ducted and that are positioned at the rear of the engine.

By way of example, such a turboprop may be attached to the fuselage of an aircraft by means of a pylon that is connected to a suspension structure, which suspension structure is directly fastened to the engine.

The suspension structure of such a turboprop needs in particular to be capable of withstanding the thrust forces from the engine and the rotary torque from the propellers. For this purpose, its architecture must enable it to reduce the loads and the accelerations that are transmitted to the aircraft, and also the effects of casing distortion in order to improve performance. Furthermore, the suspension structure needs to be optimized in order to limit the static and dynamic loads seen by the engine so as to be able to limit its weight. Finally, the architecture of the suspension structure must make it possible to conserve enough space to leave room to install the external configuration of the engine (i.e. auxiliary equipment, pipework, and harnesses).

Thus, the way a turboprop is attached to a structural element of an aircraft has a direct influence on the behavior and the performance of the engine, and therefore constitutes a line of research and endeavor for engine manufacturers.

Furthermore, this influence of the attachment of the turboprop is particularly important for turboprop architectures of the type comprising two unducted contrarotating propellers, where additional difficulties are present. In particular, such engines present a considerable overhang, thereby leading to phenomena of engine casing distortion. Likewise, engine loads are greater as a result of the engines generally being mounted at the rear of a fuselage by means of pylons of large dimensions. In addition, installing auxiliary equipment on such engines can lead to problems with conventional pylons.

OBJECT AND SUMMARY OF THE INVENTION

There thus exists a need to be able to have a structure for suspending a turboprop having two unducted propellers, which structure enables the dynamic behavior of the engine to be improved, enables the effects of casing distortion to be reduced, and facilitates installation of the engine.

In accordance with the invention, this object is achieved by a suspension structure for suspending a turboprop having two unducted propellers on a structural element of an aircraft, the suspension structure comprising a cradle for fastening to a structural element of the aircraft and having two lateral structures, each of substantially triangular shape, both of which are connected to a main beam extending parallel to a longitudinal axis of the turboprop so as to form a V-shaped cradle structure, the cradle being fastened to the turboprop via two fastener members, each connected to a free end of the lateral structures of the cradle to the turboprop, and via at least one transverse link situated in a plane extending transversely relative to the longitudinal axis of the turboprop and connecting the cradle to the turboprop.

The suspension structure of the invention allows the engine to expand freely. Furthermore, attaching the cradle to the suspension structure via two fastener members limits engine casing distortion and enables thrust forces to be taken up along the longitudinal axis of the turboprop. Finally, the function of the transverse link(s) is to block movement of the linkage constituted by the cradle and to ensure that such movement is taken up mainly by said link(s) without generating a lever arm effect on the other connections.

Preferably, the suspension structure further comprises an axial link suitable for connecting one end of the main beam of the cradle to the turboprop. This axial link serves to take up pitching of the engine created by the connection between the fastener members and the cradle.

Flexible pads may be mounted on an outside surface of the main beam of the cradle in order to attenuate the vibration generated by the turboprop and transmitted to the aircraft.

Also preferably, the fastener members are suitable for being connected to a propeller-carrying casing of the turboprop. The mechanical forces due to the overhang of the propellers thus pass directly from the casing carrying the propellers to the cradle without impacting on the gas generator of the turboprop. As a result, the operation and the performance of the turboprop are improved while also benefiting from limited weight.

Conversely, the transverse link may be suitable for being connected to an engine casing of the turboprop surrounding a gas generator. The suspension structure may include two transverse links suitable for connecting the cradle to the turboprop.

Also preferably, the fastener members are positioned on a common diameter so as to avoid giving rise to an offset in thrust takeup.

Also preferably, the axial link is positioned at the same angular distance from both fastener members so as to take up pitching created by the connections between the angle members and the cradle.

In an embodiment, each lateral structure comprises two bars that are fastened to the main beam at respective locations that are longitudinally spaced apart from each other, the two bars joining together at the free end of the lateral structure.

The invention also provides a turboprop having two unducted propellers and including a suspension structure as defined above.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF THE INVENTION

Figure 1:
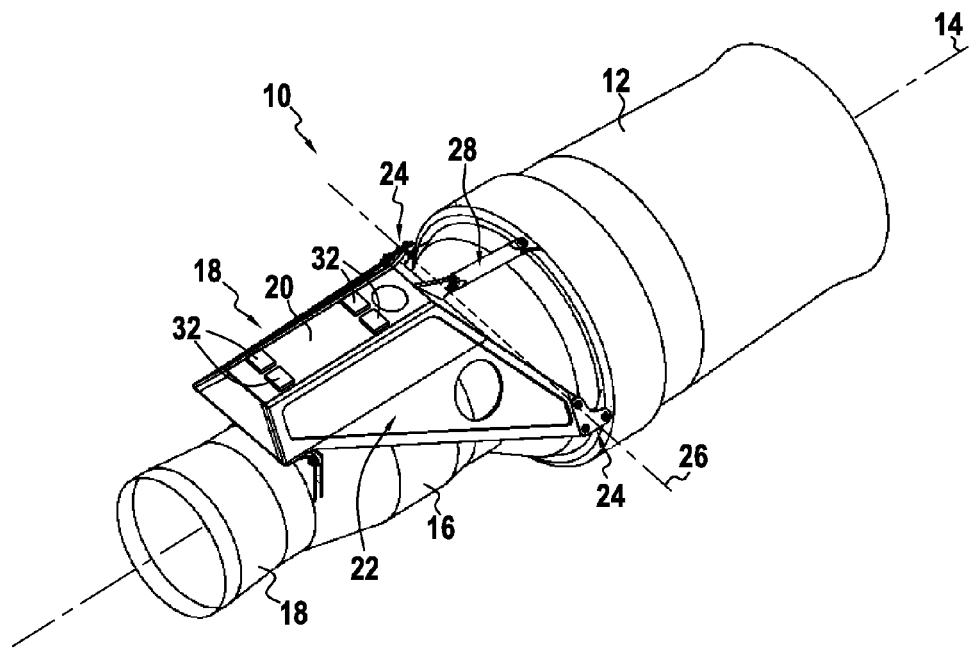
FIGS. 1 and 2 are diagrammatic perspective views of a suspension structure in an embodiment of the invention.
Figure 2:
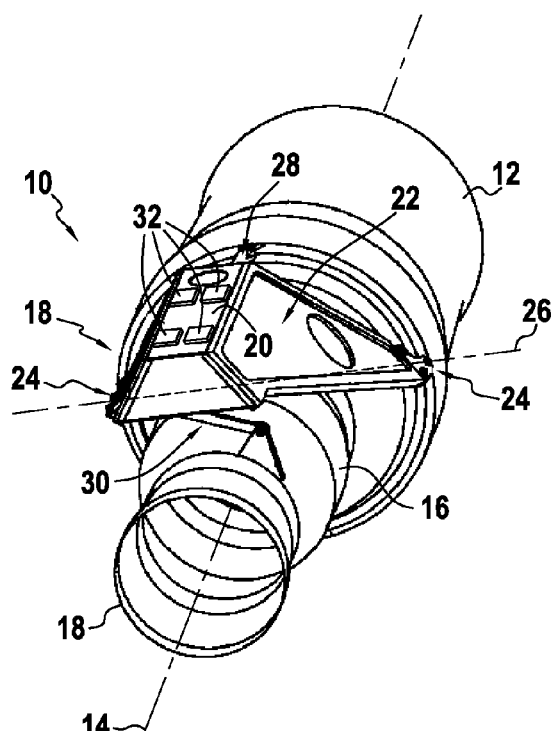

FIGS. 1 and 2 are diagrams showing a turboprop 10 of the type having two contrarotating propellers that are unducted and mounted at the rear of the engine.

More precisely, these propellers (not shown in the figures) are mounted around an annular casing 12 centered on the longitudinal axis 14 of the turboprop, and located to the rear thereof.

The casing 12 is extended towards the front of the turboprop by an engine casing 16 surrounding a gas generator (not shown) of the turboprop. The engine casing 16 is extended by a compressor casing 18 arranged at the front to the turboprop.

The turboprop 10 is fastened to a structural element of an aircraft, e.g. an airplane fuselage, by means of a suspension structure.

More precisely, the turboprop 10 is connected to a suspension structure having one end of an attachment pylon (or mast) fastened thereto, with the opposite end of the pylon being fastened to the fuselage of the airplane.

In known manner, the attachment pylon (not shown in the figures) comprises a plurality of beams connecting the suspension structure to the fuselage of the airplane, and also comprising streamlined fairings.

In accordance with the invention, the suspension structure comprises a cradle 18 formed by a main beam (or longitudinally-extending member) 20 and by two lateral structures 22 that are connected to the main beam, each of the lateral structures being substantially triangular in shape. The cradle thus forms a V-shaped structure.

The main beam 20 extends parallel to the longitudinal axis 14 of the turboprop and is arranged at "12 o'clock" relative thereto. The various beams of the attachment pylon are for mounting on the main beam of the cradle.

Figure 3:
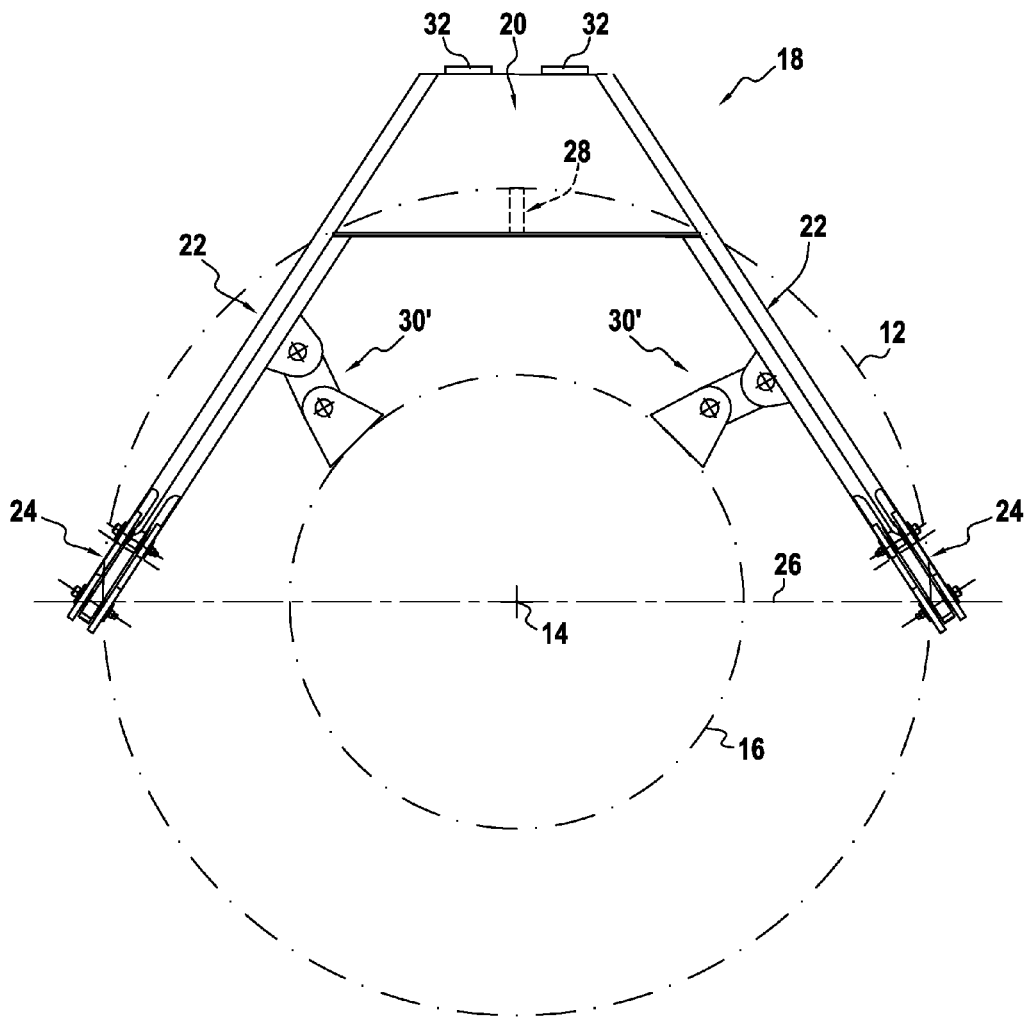
FIG. 3 is a cross-section view of a suspension structure in another embodiment of the invention.

Each of the lateral structures 22 forms a triangle, and in the embodiment of FIGS. 1 to 3 they are constituted by triangular plates.

The suspension structure of the invention also has various connections between the cradle 18 and the turboprop.

In particular, the suspension structure has two fastener members 24 connecting each of the free ends of the lateral structures 22 of the cradle 18 to the turboprop. More precisely, these fastener members 24 serve to fasten the rear end of the cradle to the propeller-carrying casing 12 of the turboprop.

In the embodiments of FIGS. 1 to 3, the fastener members 24 are V-shaped angle members having one lug fastened to the casing 12 of the turboprop. As shown in FIGS. 2 and 3, the axis 26 on which the lugs of the two angle members fastened to the casing 12 both lie advantageously intersects the longitudinal axis 14 of the casing so as to avoid any offset in taking up thrust (in other words, the angle members both lie on the same diameter).

Casing distortion is a phenomenon associated with bending deformation of the turboprop body, which in turn leads to deformation of the casing around the rotor, causing the casing to become ovalized, in such a manner as to increase operating clearances and thus degrade the performance of the engine. The particular positioning of the angle members 24 on the same diameter enables the effects thereof to be limited.

As shown in FIGS. 1 and 2, the suspension structure also has an axial connecting link 28 that connects the rear end of the main beam 20 of the cradle 18 to the turboprop.

More precisely, this axial link 28 may be positioned at "12 o'clock" relative to the turboprop and at the same angular distance from both fastener members 24. The axial link thus serves to take up the pitching created by the connection of the fastener members 24 to the cradle 18.

Like the fastener members 24, the axial link 28 is fastened to the propeller-carrying casing 12 of the turboprop. As a result, mechanical forces due to the propellers being cantilevered out pass directly from the casing 12 to the cradle 18 without transiting via the gas generator of the turboprop, thereby improving its operation and its performance without impacting its weight.

The suspension structure also has at least one transverse link 30 situated in a plane extending transversely relative to the longitudinal axis 14 of the turboprop and connecting the cradle 18 to the turboprop so as to block the linkage created by the connections between the fastener members 24 and the turboprop 10 and between the axial link 28 and the turboprop.

In the embodiment of FIGS. 1 and 2, a single transverse link 30 is provided that is fastened by ball joints, firstly to the inside surface of one of the lateral structures 22 of the cradle and secondly to the engine casing 16 of the turboprop. Furthermore, this transverse link 30 extends in a direction that is substantially tangential relative to the engine casing 16.

Alternatively, in the embodiment of FIG. 3, two transverse links 30' are provided that are fastened by ball joints, firstly to the inside surface of respective ones of the lateral structures 22 of the cradle, and secondly to the engine casing 16 of the turboprop. Furthermore, these two transverse links 30' extend in directions that are substantially radial relative to the engine casing 16.

The presence of these transverse links 30, 30' serves to take up the movements of the linkage created by the connections between the fastener members 24 and the turboprop 10 and the axial link 28 and the turboprop, while not generating a lever arm effect on these connections. This serves to limit the loads that are transmitted to the turboprop.

In an advantageous provision, the suspension structure also includes means for attenuating the vibration generated by the turboprop and transmitted to the airplane.

For example, these means may be in the form of flexible pads 32 mounted on an outside surface of the main beam 20 of the cradle 18 where the connections are made between the beams and the attachment pylon.

Figure 4:
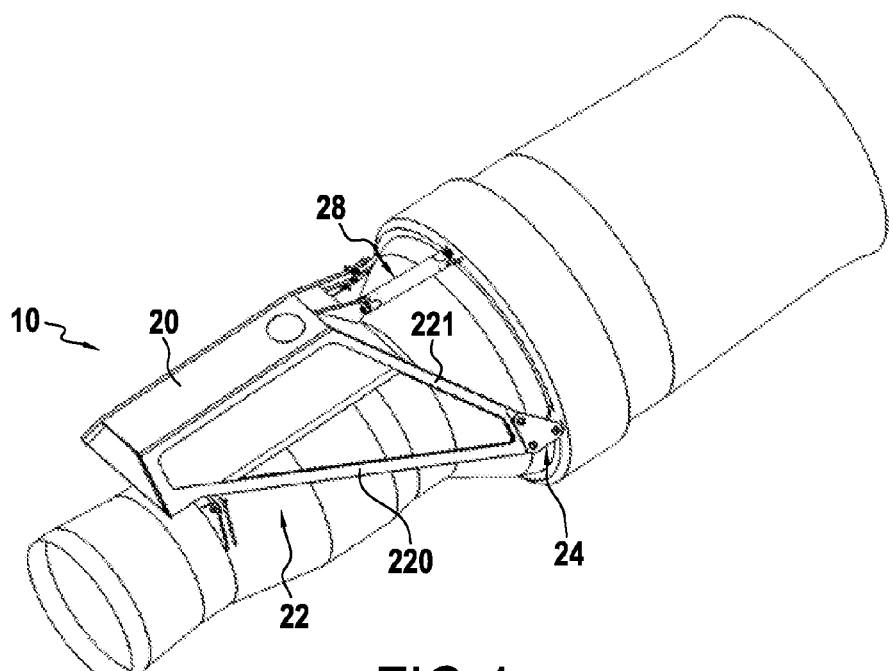
FIGS. 4 and 5 are diagrammatic views in perspective of a suspension structure in yet another embodiment of the invention.
Figure 5:
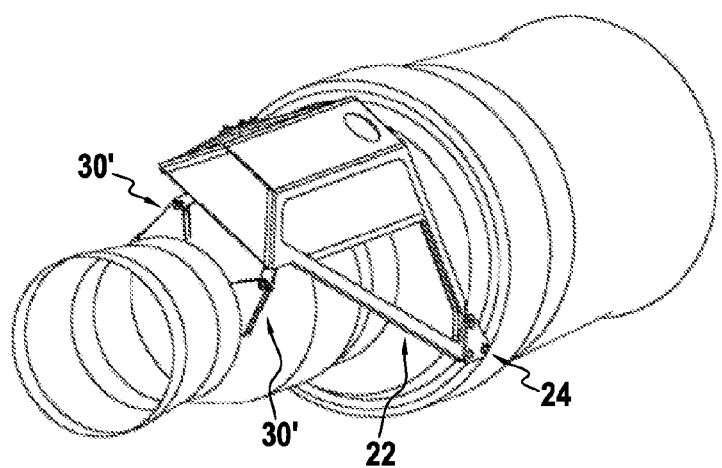

FIGS. 4 and 5 show another embodiment of a suspension structure in accordance with the invention.

This suspension structure differs from that described with reference to FIGS. 1 to 3 in that each lateral structure 22 of the cradle comprises two bars 220, 221, each of which is connected at one of its ends to the main beam 20 at respective locations that are longitudinally spaced apart from each other.

Furthermore, the ends of these two bars 220, 221 that are opposite from their ends fastened to the main beam join together at the corresponding free end of the lateral structure 22 so as to co-operate with the main beam to form a V-shaped lateral structure. These ends that are joined together are fastened to the turboprop via fastener members 24 in similar manner to that described with reference to FIGS. 1 to 3.

The invention claimed is:

1. A suspension structure for suspending a turboprop having two unducted propellers on a structural element of an aircraft, the suspension structure comprising a cradle for fastening to a structural element of the aircraft and having two lateral structures, each of substantially triangular shape, both of which are connected to a main beam extending parallel to a longitudinal axis of the turboprop so as to form a V-shaped cradle structure, the cradle being fastened to the turboprop via two fastener members, each connected to a free end of the lateral structures of the cradle to the turboprop, and via at least one transverse link situated in a plane extending transversely relative to the longitudinal axis of the turboprop and connecting the cradle to the turboprop.

2. A structure according to claim 1, further comprising an axial link suitable for connecting one end of the main beam of the cradle to the turboprop.

3. A structure according to claim 1, including flexible pads mounted on an outside surface of the main beam of the cradle in order to attenuate the vibration generated by the turboprop and transmitted to the aircraft.

4. A structure according to claim 1, wherein the fastener members are suitable for being connected to a propeller-carrying casing of the turboprop.

5. A structure according to claim 1, wherein the transverse link is suitable for being connected to an engine casing of the turboprop surrounding a gas generator.

6. A structure according to claim 1, including two transverse links suitable for connecting the cradle to the turboprop.

7. A structure according to claim 1, wherein the fastener members are positioned on a common diameter.

8. A structure according to claim 2, wherein the axial link is positioned at the same angular distance from both fastener members.

9. A structure according to claim 1, wherein each lateral structure comprises two bars that are fastened to the main beam at respective locations that are longitudinally spaced apart from each other, the two bars joining together at the free end of the lateral structure.

10. A turboprop having two unducted propellers and including a suspension structure according to claim 1.

* * * * *